United States Patent
Lichtenau et al.

(10) Patent No.: US 11,256,511 B2
(45) Date of Patent: Feb. 22, 2022

(54) INSTRUCTION SCHEDULING DURING EXECUTION IN A PROCESSOR

(71) Applicant: International Business Machines Corporation, Armonk, NY (US)

(72) Inventors: Cedric Lichtenau, Stuttgart (DE); Stefan Payer, Stuttgart (DE); Kerstin Claudia Schelm, Stuttgart (DE); Anthony Saporito, Highland, NY (US); Gregory William Alexander, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 16/416,581

(22) Filed: May 20, 2019

(65) Prior Publication Data
US 2020/0371810 A1  Nov. 26, 2020

(51) Int. Cl.
*G06F 9/38* (2018.01)
*G06F 9/50* (2006.01)

(52) U.S. Cl.
CPC .......... *G06F 9/3836* (2013.01); *G06F 9/3861* (2013.01); *G06F 9/50* (2013.01)

(58) Field of Classification Search
CPC .... G06F 9/3836; G06F 9/3885; G06F 9/3891; G06F 9/4881
See application file for complete search history.

(56) References Cited

U.S. PATENT DOCUMENTS

| | | | | |
|---|---|---|---|---|
| 5,519,864 A | * | 5/1996 | Martell | G06F 9/3855 712/215 |
| 5,555,432 A | * | 9/1996 | Hinton | G06F 9/30145 712/216 |
| 5,592,679 A | * | 1/1997 | Yung | G06F 15/8007 712/23 |
| 5,615,385 A | * | 3/1997 | Fetterman | G06F 9/384 712/23 |
| 6,260,138 B1 | | 7/2001 | Harris | |
| 6,351,802 B1 | * | 2/2002 | Sheaffer | G06F 9/3802 712/215 |
| 7,502,912 B2 | * | 3/2009 | Sodani | G06F 9/3836 712/214 |
| 2005/0138622 A1 | | 6/2005 | McAlpine et al. | |
| 2008/0133889 A1 | * | 6/2008 | Glew | G06F 9/3875 712/214 |
| 2014/0372733 A1 | | 12/2014 | Diewald et al. | |

* cited by examiner

*Primary Examiner* — Jyoti Mehta
*Assistant Examiner* — Kasim Alli
(74) *Attorney, Agent, or Firm* — Cantor Colburn LLP; Gail Zarick

(57) ABSTRACT

A method of performing instruction scheduling during execution in a processor includes receiving, at an execution unit of the processor, an initial assignment of an assigned execution resource among two or more execution resources to execute an operation. An instruction includes two or more operations. Based on determining that the assigned execution resource is not available, the method also includes determining, at the execution unit, whether another execution resource among the two or more execution resources is available to execute the operation. Based on determining that the other execution resource is available, the method further includes executing the operation with the other execution resource.

20 Claims, 3 Drawing Sheets

INSTRUCTION SCHEDULING DURING EXECUTION IN A PROCESSOR

BACKGROUND

The present invention relates to the execution of instructions in a processor, and more specifically, to instruction scheduling during execution in a processor.

The implementation of a software program involves the execution of many instructions by the processor. Instruction pipelining is a technique to implement instruction-level parallelism within a single processor. Instructions are divided into a series of sequential steps (i.e., pipeline stages) that are performed by different processor units in sequence. Different instructions may be executing different steps in parallel. Thus, every part of the processor can be used at all times to increase the throughput. Through the pipelining technique, multiple instructions can be overlapped during execution. The execution stage can involve different execution units. Typically, instructions are grouped, and a given group is sent to the same execution unit for processing. The grouping can happen very early in the pipeline and changing the assigned execution unit can involve significant additional logic.

SUMMARY

Embodiments of the present invention are directed to processors, executions units, and methods to perform instruction scheduling during execution in a processor. A method includes receiving, at an execution unit of the processor, an initial assignment of an assigned execution resource among two or more execution resources to execute an operation. An instruction includes two or more operations. Based on determining that the assigned execution resource is not available, the method includes determining, at the execution unit, whether another execution resource among the two or more execution resources is available to execute the operation. Based on determining that the other execution resource is available, the method also includes executing the operation with the other execution resource.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, more than one execution unit can be available at the execution stage of pipelined instruction processing technique. Grouping instructions for execution by the same execution unit can reduce the tracking hardware needed. However, when grouping is done very early in the pipeline processing (e.g., by the instruction decode unit (IDU)), as is typical, inefficiencies can result. For example, a multicycle instruction (e.g., divide, long multiply, square root) can include multiple operations that run for tens of cycles, and the exact duration can be data dependent. That is, a given operation of the multicycle instruction can rely on data obtained by first processing another operation of the multicycle instruction. This dependency complicates whether and how operations can be assigned to different execution units. Typical grouping leads to the multiple operations of a multicycle instruction being grouped together and assigned to the same execution unit. The result is that parallelism in the execution pipeline is not used at all, leading to inefficiency. Yet, changing the execution unit assignment of a given operation requires significant additional logic.

A prior approach to mitigating the above-noted issues involves using software to steer the group building. This approach can result in ensuring that operations of a multi-cycle instruction are not all assigned to the same execution unit. However, while this approach facilitates some parallelism, it is not robust enough to address data dependency. That is, an operation of the multicycle instruction that relies on data from another operation cannot be sent to a different execution unit than the other operation. Thus, efficiency cannot be maximized.

Embodiments of the invention involve instruction scheduling during execution in a processor. Hardware logic in the processor and, specifically, in the execution engine, is used to schedule instructions. A local scheduler of the execution engine addresses both parallelism and data dependency. Parallelism is ensured by scheduling operations of a multi-cycle instruction individually. A given operation that requires data resulting from processing another operation need not be executed by the same execution unit as the other operation. At the same time, the prior execution of the other operation and availability of the data is ensured before the given operation is assigned to an execution unit and processed.

Figure 1:
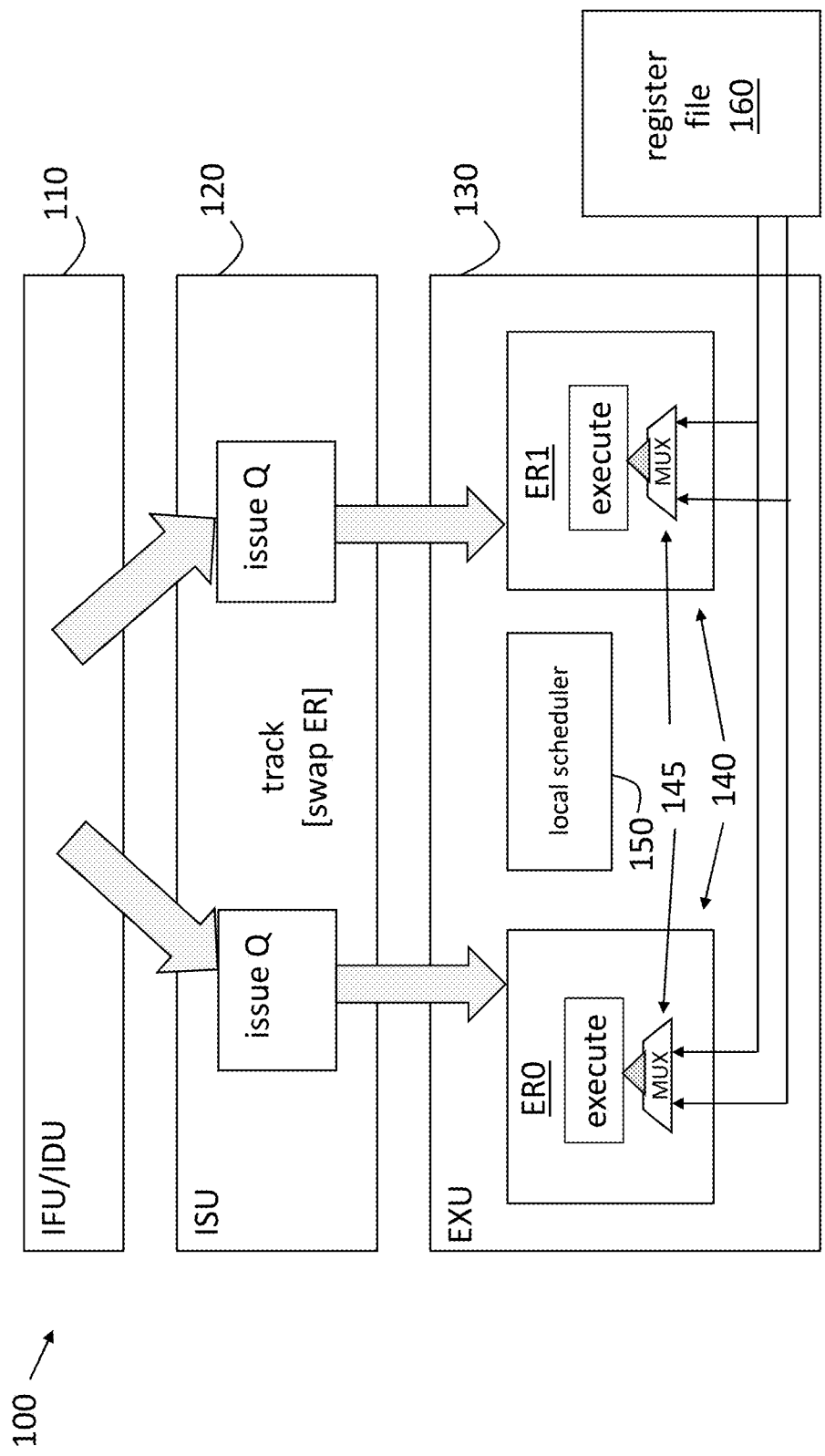
FIG. 1 is a block diagram of aspects of a processor according to one or more embodiments of the invention.

FIG. 1 is a block diagram of aspects of a processor 100 according to one or more embodiments of the invention. An instruction fetch unit (IFU) and the IDU are shown together as IFU/IDU 110. An instruction sequencing unit (ISU) 120 ensures that dependencies are properly considered. An execution unit (EXU) 130 can include a number of execution resources (ERs) 140. The ERs 140 can be identical in structure and, thus, interchangeable in terms of processing an operation. The arrows between the block 110 and block 120 and between block 120 and block 130 indicate the overall flow that also defines the traditional flow.

That is, an instruction is fetched and decoded at the IFU/IDU 110 and provided to an issue queue (Q) of the ISU 120. For explanatory purposes, the nomenclature used herein is that an instruction (e.g., add, divide, multiply) is considered to include a number of operations. In prior processors, the ISU 120 assigns a particular ER 140 within the EXU 130 to operations of an instruction. As previously noted, all of the operations of a multi-cycle instruction may conventionally have been assigned to the same ER 140. As also noted, this type of scheduling leads to inefficiencies because it fails to take advantage of the available parallelism afforded by multiple ERs 140 of the EXU 130. According to one or more embodiments of the invention, dynamic assignment of an ER 140 to a pending operation is facilitated during the execution in the EXU 130. Consequently, the inefficiencies of prior assignment of an ER 140 are addressed.

According to one or more embodiments of the invention, the local scheduler 150 of the EXU 130 facilitates additional communication and efficient instruction scheduling during execution. The exemplary EXU 130 of FIG. 1 includes two execution resources ER0 and ER1 (generally referred to as execution module (ER) 140). According to alternate embodiments of the invention, the ISU 120 can include any number of issue Qs, and the EXU 130 can include any number of ERs 140. The local scheduler 150 is added to the ExU block 130, according to one or more embodiments of the invention. The ISU 120, which still tracks dependencies among operations, is also modified according to one or more embodiments of the invention such that it can handle a dynamic change in the assigned ER 140 by the local scheduler 150 based on availability.

The local scheduler 150 facilitates instruction scheduling during execution according to one or more embodiments of the invention. As further detailed with reference to FIG. 2, the ISU 120 initially assigns a given ER 140 to an operation. However, the local scheduler 150 can facilitate a change in this assignment by notifying the ISU 120 of available ERs 140. The local scheduler 150 monitors the ERs 140 so that the ISU 120 can assign a pending operation to any available ER 140 rather than waiting for an initially assigned ER 140 to become available. The dynamic assignment of ERs 140 is further facilitated by the multiplexers 145 of the EXU 130 that allow data needed by a given operation to be provided to whichever ER 140 has been assigned.

Figure 2:
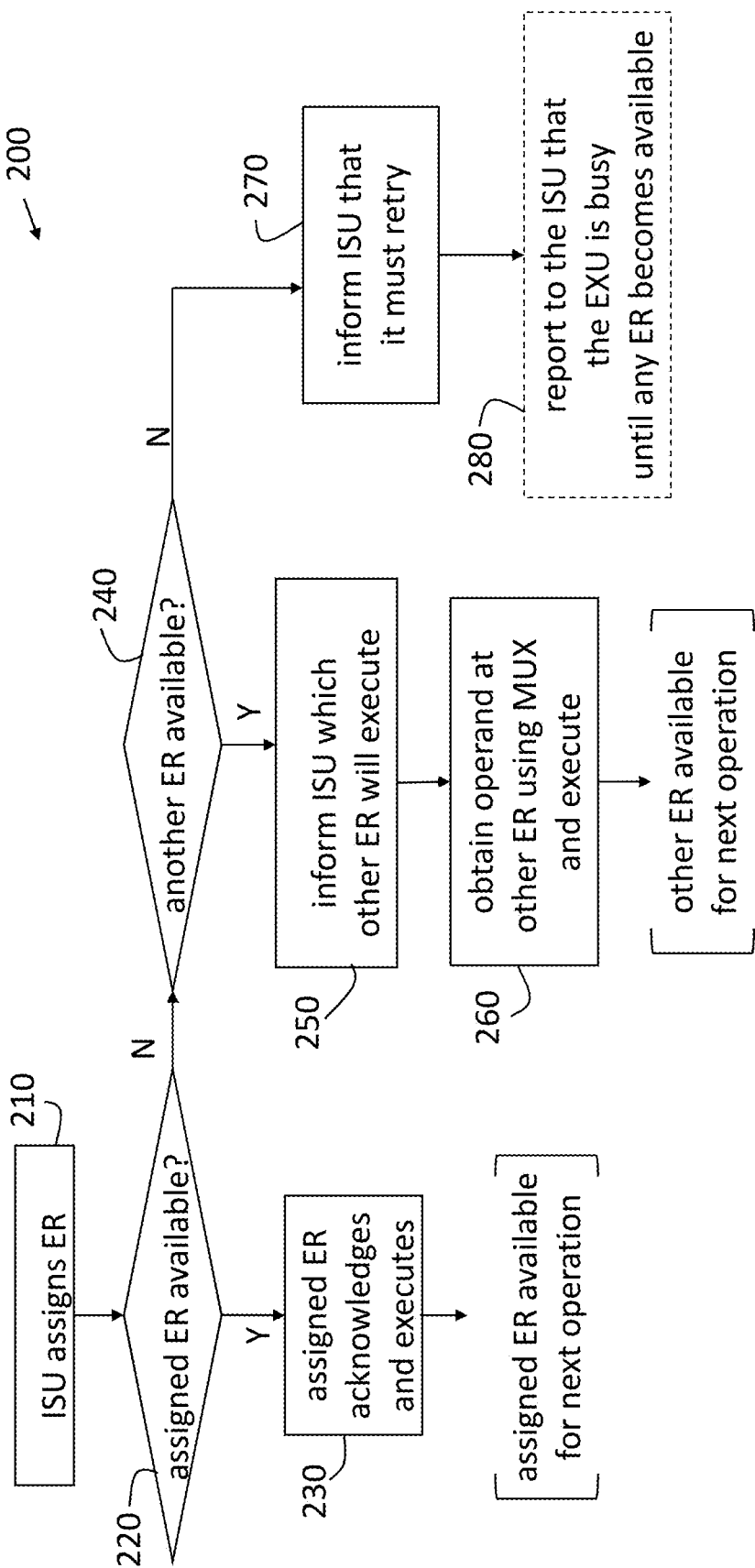
FIG. 2 is a process flow of a method of performing instruction scheduling during execution according to an exemplary embodiment of the invention.

FIG. 2 is a process flow of a method 200 of performing instruction scheduling during execution according to an exemplary embodiment of the invention. At block 210, the ISU assigns an ER 140 to an operation. At block 220, a check is done of whether the assigned ER 140 is available. If it is, then, at block 230, the local scheduler 150 provides an acknowledgment to the ISU 120, and the assigned ER 140 executes the operation. As indicated in FIG. 2, once the assigned ER 140 executes the operation, it is available again to execute another operation. This information can be provided to the local scheduler 150 by request or by default to update the local scheduler 150 on which ERs 140 are available.

If, during the check at block 220, the local scheduler 150 determines that the assigned ER 140 is not available, then the local scheduler 150 determines, at block 240, if another ER 140 is available. This includes determining if an operation is assigned for the current cycle, as well as determining whether an ongoing execution is continuing. If the local scheduler 150 determines, at block 240, that another ER 140 (i.e., different than the assigned ER 140 of the ISU 120) is available, then the local scheduler 150 informs the ISU 120 which other ER 140 will be executing the operation, at block 250. This information can be in the form of an acknowledgment message, for example.

The information from the local scheduler 150 to the ISU 120 facilitates the ISU 120 continuing to address dependencies. For example, if the operation assigned at block 210 by the ISU 120 results in data that is needed by another operation, the ISU 120 must know when that data is available so that it can then know when the other operation may be provided for execution. The ISU 120 tracks the completion of execution by each ER 140. However, according to one or more embodiments of the invention, the correspondence between an ER 140 and an operation being executed can be changed in the execution stage, based on the checks at blocks 220 and 240. Thus, the ISU 120 needs to be updated about which ER 140 is executing which operation.

As indicated in FIG. 1, the ISU 120 can use the update to swap the ER 140 that it associates with a given operation for purposes of tracking.

At block 260, the other ER 140 that is found to be available at block 240 uses the MUX 145 to obtain operands needed to execute the operation from the register file 160. The other ER 140 can then execute the operation. Once execution of the operation has been completed, the other ER 140 is available to execute another operation. This information can be provided to the local scheduler 150 by request or by default to update the local scheduler 150 on which ERs 140 are available.

If, during the check at block 240, the local scheduler 150 determines that not only the assigned ER 140 but also all other ERs 140 are not available, then the process flow continues to block 270. At block 270, the local scheduler 150 informs the ISU 120 that the EXU 130 is busy and the ISU 120 must retry its request to execute the operation. As indicated at block 280, optionally, the local scheduler 150 can report the busy condition until one of the ERs 140 becomes available. In the case of this optional process, the ISU 120 need not keep sending requests that may be rejected but, instead, can wait until it is informed that an ER 140 is available to resend the execution request.

Figure 3:
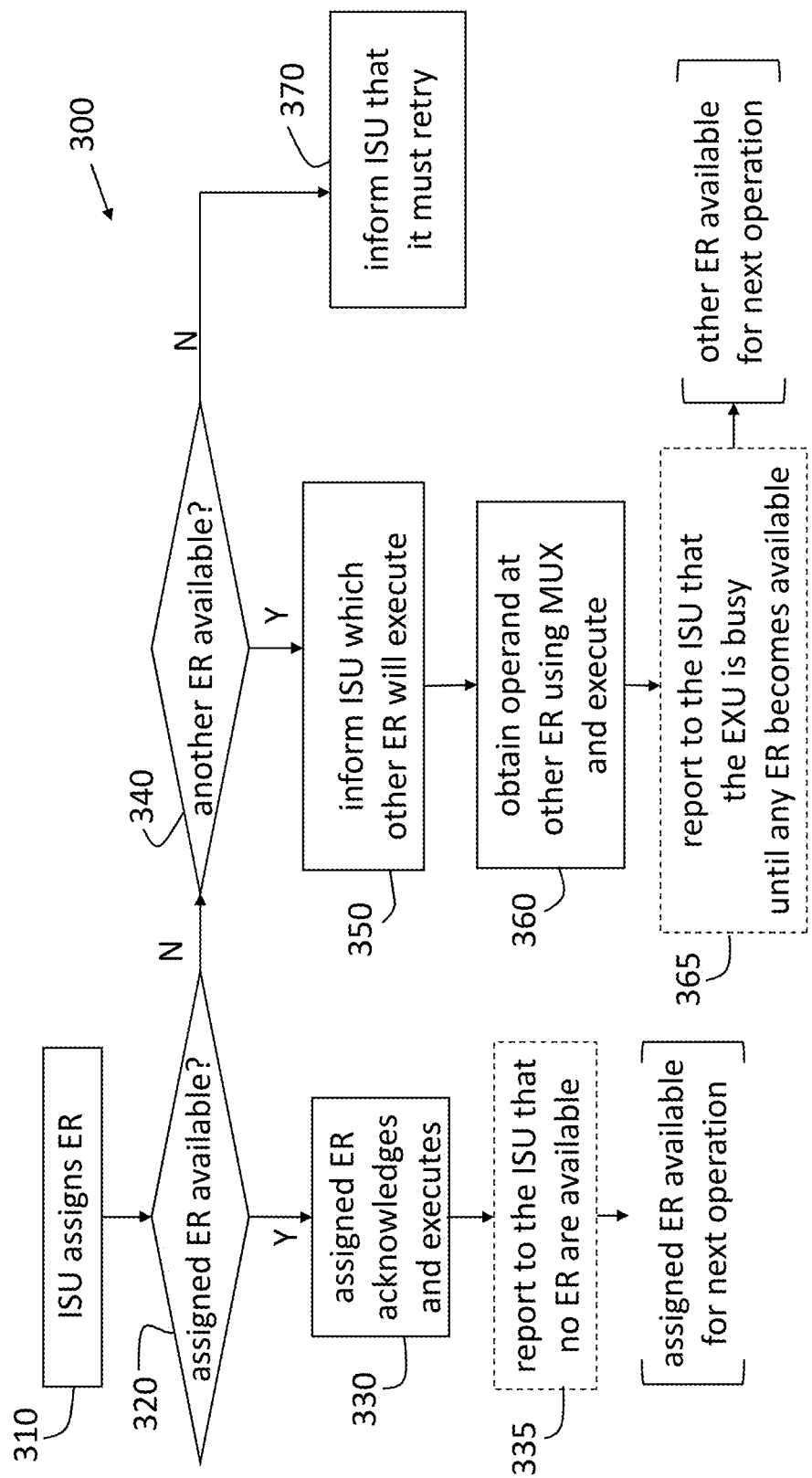
FIG. 3 is a process flow of a method of performing instruction scheduling during execution according to another exemplary embodiment of the invention.

FIG. 3 is a process flow of a method 300 of performing instruction scheduling during execution according to another exemplary embodiment of the invention. According to the embodiment shown in FIG. 3, the ISU 120 is kept informed about the availability of the ERs 140 in order to preempt the ISU 120 from sending an operation that cannot be executed. The processes in FIG. 3 that are similar to those in FIG. 2 are not detailed again. At block 310, similar to the process at block 210, the ISU assigns an ER 140 to an operation. At block 320, as at block 220, a check is done of whether the assigned ER 140 is available. If it is, then, at block 330, the local scheduler 150 provides an acknowledgment to the ISU 120, and the assigned ER 140 executes the operation. This is similar to the process at block 230. Additionally and optionally, according to the embodiment shown in FIG. 3, the ISU 120 can be informed that all ERs 140 are now unavailable, at block 335. This would prevent the ISU 120 from issuing any operations unnecessarily when no ER 140 is available. As a comparison of FIGS. 2 and 3 indicates, once the assigned ER 140 executes the operation, it is available again to execute another operation.

If, during the check at block 320, the local scheduler 150 determines that the assigned ER 140 is not available, then the local scheduler 150 determines, at block 340, if another ER 140 is available. This includes determining if an operation is assigned for the current cycle, as well as determining whether an ongoing execution is continuing. The process at block 340 is similar to the one at block 240. If the local scheduler 150 determines, at block 340, that another ER 140 (i.e., different than the assigned ER 140 of the ISU 120) is available, then the local scheduler 150 informs the ISU 120 which other ER 140 will be executing the operation, at block 350 like at block 250. This information can be in the form of an acknowledgment message, for example.

At block 360, the other ER 140 that is found to be available at block 340 uses the MUX 145 to obtain operands needed to execute the operation from the register file 160. The other ER 140 can then execute the operation. This is similar to the process at block 260. An optional additional process, at block 365, includes reporting to the ISU 120 that the EXU 130 is busy until any one of the ERs 140 becomes available. This process facilitates preempting the ISU 120 from sending an operation to the EXU 130 before an ER 140 is available. Once execution of the operation has been completed, the other ER 140 is available to execute another operation. This information can be provided to the local scheduler 150 by request or by default to update the local scheduler 150 on which ERs 140 are available. If, during the check at block 340, the local scheduler 150 determines that not only the assigned ER 140 but also all other ERs 140 are not available, then the process flow continues to block 370. At block 370, like at block 270, the local scheduler 150 informs the ISU 120 that the EXU 130 is busy and the ISU 120 must retry its request to execute the operation.

Various embodiments of the present invention are described herein with reference to the related drawings. Alternative embodiments can be devised without departing from the scope of this invention. Although various connections and positional relationships (e.g., over, below, adjacent, etc.) are set forth between elements in the detailed description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Similarly, the term "coupled" and variations thereof describe having a communications path between two elements and does not imply a direct connection between the elements with no intervening elements/connections between them. All of these variations are considered a part of the specification. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrase "selective to," such as, for example, "a first element selective to a second element," means that the first element can be etched and the second element can act as an etch stop.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of performing instruction scheduling during execution in a processor, the method comprising:

receiving, at an execution unit of the processor, an initial assignment of an assigned execution resource among two or more execution resources to execute an operation, wherein an instruction includes two or more operations and the initial assignment of the assigned execution resource is based on an assignment of another operation whose output is needed by the operation;

based on determining that the assigned execution resource is not available, determining, by a local scheduler at the execution unit, whether another execution resource among the two or more execution resources is available to execute the operation;

based on determining that the other execution resource is available, executing the operation with the other execution resource;

an instruction sequencing unit of the processor, which precedes the execution unit in a pipeline processing arrangement, providing the initial assignment of the assigned execution resource to the execution unit; and the local scheduler providing a notification to the instruction sequencing unit to indicate which execution resource among the two or more execution resources is the other execution resource that will process the operation based on the determining that the assigned execution resource is not available, on determining that data needed by the operation is available, and on the determining that the other execution resource is available.

2. The method according to claim 1, further comprising the execution unit notifying the instruction sequencing unit to retry sending the operation for execution based on the determining that the assigned execution resource is not available and based on also determining that no other execution resource among the two or more execution resources is available.

3. The method according to claim 1, further comprising the execution unit notifying the instruction sequencing unit not to retry sending the operation for execution, based on the determining that the assigned execution resource is not available and on determining that no other execution resource among the two or more execution resources is available, until one of the two or more execution resources becomes available.

4. The method according to claim 1, further comprising the execution unit notifying the instruction sequencing unit and precluding the instruction sequencing unit from sending an additional operation based on determining that the assigned execution resource is available to execute the operation and that others of the two or more execution resources are not available.

5. The method according to claim 1, further comprising the execution unit notifying the instruction sequencing unit and precluding the instruction sequencing unit from sending an additional operation until one of the two or more execution resources becomes available based on the determining that the assigned execution resource is not available and on the determining that the other execution resource is available to execute the operation.

6. The method according to claim 1, further comprising the assigned execution resource using a multiplexer of the assigned execution resource to obtain an operand needed to execute the operation based on determining that the assigned execution resource is available and the other execution resource using a multiplexer of the other execution resource to obtain the operand based on determining that the assigned execution resource is not available and that the other execution resource is available.

7. The method according to claim 1, further comprising the instruction sequencing unit using the notification to track dependencies between the operation and others of the two or more operations.

8. A processor to perform instruction scheduling during execution, the processor comprising:
an execution unit including execution resources;
an instruction sequencing unit configured to assign an assigned execution resource among the execution resources to execute an operation, wherein the assigning of the assigned execution resource is based on an assignment of another operation whose output is needed by the operation; and
a local scheduler of the execution unit configured to determine whether another execution resource among the execution resources is available to execute the operation based on determining that the assigned execution resource is not available, wherein the other execution resource executes the operation based on the local scheduler determining that the assigned execution resource is not available and that the other execution resource is available, wherein the local scheduler is configured to provide a notification to the instruction sequencing unit to indicate which execution resource among the execution resources is the other execution resource that will process the operation based on determining that the assigned execution resource is not available, that data needed by the operation is available, and that the other execution resource is available.

9. The processor according to claim 8, wherein the local scheduler is configured to notify the instruction sequencing unit to retry sending the operation for execution based on determining that the assigned execution resource is not available and that the other execution resource is also not available.

10. The processor according to claim 8, wherein the local scheduler is configured to notify the instruction sequencing unit not to retry sending the operation for execution, based on determining that the assigned execution resource is not available and that no other execution resource among the execution resources is available, until one of the execution resources becomes available.

11. The processor according to claim 8, wherein the local scheduler is configured to notify the instruction sequencing unit and preclude the instruction sequencing unit from sending an additional operation based on determining that the assigned execution resource is available to execute the operation and that no other execution resources among the execution resources are available.

12. The processor according to claim 8, wherein the local scheduler is configured to notify the instruction sequencing unit and preclude the instruction sequencing unit from sending an additional operation until one of the execution resources becomes available based on determining that the assigned execution resource is not available and that the other execution resource is available to execute the operation.

13. The processor according to claim 8, further comprising a multiplexer of each of the execution resources, wherein the multiplexer of the assigned execution resource obtains an operand needed to execute the operation based on the local scheduler determining that the assigned execution resource is available and the multiplexer of the other execution resource obtains the operand based on the local scheduler determining that the assigned execution resource is not available and that the other execution resource is available.

14. The processor according to claim 8, wherein the instruction sequencing unit is configured to use the notification to track dependencies between the operation and other operations.

15. An execution unit of a processor, comprising:
two or more execution resources; and
a local scheduler configured to obtain, from an instruction sequencing unit, an assignment of an assigned execution resource among the two or more execution resources to execute an operation and to determine whether another execution resource among the execution resources is available to execute the operation based on determining that the assigned execution resource is not available, wherein the other execution resource executes the operation based on the local scheduler determining that the assigned execution resource is not available and that the other execution resource is available and the assignment of the assigned execution resource is based on an assignment of another operation whose output is needed by the operation, and the local scheduler is configured to provide a notification to the instruction sequencing unit to indicate which execution resource among the execution resources is the other execution resource that will process the operation based on determining that the assigned execution resource is not available and that the other execution resource is available.

16. The execution unit according to claim 15, wherein the local scheduler is configured to notify the instruction sequencing unit to retry sending the operation for execution based on determining that the assigned execution resource is not available, that data needed by the operation is available, and that the other execution resource is also not available.

17. The execution unit according to claim 15, wherein the local scheduler is configured to notify the instruction sequencing unit not to retry sending the operation for execution, based on determining that the assigned execution resource is not available and that no other execution resource among the execution resources is available, until one of the execution resources becomes available.

18. The execution unit according to claim 15, wherein the local scheduler is configured to notify the instruction sequencing unit and preclude the instruction sequencing unit from sending an additional operation based on determining that the assigned execution resource is available to execute the operation and no other execution resources among the execution resources are available or until one of the execution resources becomes available based on determining that the assigned execution resource is not available and that the other execution resource is available to execute the operation.

19. The execution unit according to claim 15, further comprising a multiplexer of each of the execution resources, wherein the multiplexer of the assigned execution resource obtains an operand needed to execute the operation based on the local scheduler determining that the assigned execution resource is available and the multiplexer of the other execution resource obtains the operand based on the local scheduler determining that the assigned execution resource is not available and that the other execution resource is available.

20. The execution unit according to claim 15, wherein the instruction sequencing unit is configured to use the notification to track dependencies between the operation and other operations.

* * * * *